(12) United States Patent
Cai et al.

(10) Patent No.: US 11,383,675 B2
(45) Date of Patent: Jul. 12, 2022

(54) SYSTEMS AND METHODS FOR CONTROLLING A LOCK OF A VEHICLE

(71) Applicant: BEIJING QISHENG SCIENCE AND TECHNOLOGY CO., LTD., Beijing (CN)

(72) Inventors: Zuhang Cai, Hangzhou (CN); Fei Lu, Hangzhou (CN)

(73) Assignee: BEIJING QISHENG SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/218,140

(22) Filed: Mar. 30, 2021

(65) Prior Publication Data
US 2021/0229632 A1    Jul. 29, 2021

Related U.S. Application Data

(63) Continuation of application No. PCT/CN2019/109071, filed on Sep. 29, 2019.

(30) Foreign Application Priority Data

Sep. 30, 2018  (CN) .......................... 201811161064.4

(51) Int. Cl.
*B60R 25/24* (2013.01)
*B60R 25/32* (2013.01)
*B60R 25/33* (2013.01)

(52) U.S. Cl.
CPC ............ *B60R 25/241* (2013.01); *B60R 25/32* (2013.01); *B60R 25/33* (2013.01)

(58) Field of Classification Search
CPC ........ B60R 25/241; B60R 25/32; B60R 25/33
See application file for complete search history.

(56) References Cited

U.S. PATENT DOCUMENTS

| 5,760,681 | A | * | 6/1998 | Varis | ........................ | B62H 5/20 |
| | | | | | | 200/61.64 |
| 5,917,407 | A | * | 6/1999 | Squire | ...................... | B62H 3/00 |
| | | | | | | 340/432 |
| 5,986,543 | A | * | 11/1999 | Johnson | ................ | B60R 25/102 |
| | | | | | | 340/426.19 |

(Continued)

FOREIGN PATENT DOCUMENTS

| CN | 1522903 A | 8/2004 |
| CN | 205499130 U | 8/2016 |

(Continued)

OTHER PUBLICATIONS

First Office Action in Chinese Application No. 201811161064.4 dated Jul. 31, 2020, 31 pages.

(Continued)

*Primary Examiner* — Nay Tun
(74) *Attorney, Agent, or Firm* — Metis IP LLC

(57) ABSTRACT

The present disclosure relates to systems and methods for controlling a lock of a vehicle. The methods may include determining if there is a valid unlocking instruction when the vehicle is in a valid-unlocked state; determining if the vehicle is moved; sending a locking instruction to the lock upon the determination that: there is not a valid unlocking instruction, and the vehicle is moved; or keeping the lock in the valid-unlocked state.

20 Claims, 10 Drawing Sheets

(56) References Cited

U.S. PATENT DOCUMENTS

| | | | | |
|---|---|---|---|---|
| 7,729,822 | B2* | 6/2010 | Le Gars | B62J 6/02 |
| | | | | 701/33.4 |
| 7,973,652 | B1* | 7/2011 | Smith | A42B 3/0466 |
| | | | | 340/432 |
| 9,610,948 | B2* | 4/2017 | Kumar | B61L 3/006 |
| 2004/0160314 | A1* | 8/2004 | Utter | B60R 25/102 |
| | | | | 340/426.1 |
| 2004/0164850 | A1* | 8/2004 | Konno | B60R 25/24 |
| | | | | 340/426.1 |
| 2008/0027794 | A1* | 1/2008 | Le Gars | G07F 17/0057 |
| | | | | 705/13 |
| 2011/0224897 | A1* | 9/2011 | Tan | G01C 21/3664 |
| | | | | 701/532 |
| 2014/0265237 | A1 | 9/2014 | Strother et al. | |
| 2016/0180721 | A1* | 6/2016 | Otulic | B60Q 9/00 |
| | | | | 701/2 |
| 2016/0225203 | A1* | 8/2016 | Asmar | G07C 9/00309 |
| 2017/0164072 | A1* | 6/2017 | Tsujita | B60C 23/04 |
| 2017/0267214 | A1* | 9/2017 | Penilla | G07F 15/005 |
| 2018/0015974 | A1* | 1/2018 | Yang | E05B 39/005 |
| 2018/0154867 | A1* | 6/2018 | Golduber | B60R 25/104 |
| 2018/0363337 | A1* | 12/2018 | Zhu | G06K 9/00798 |
| 2019/0031283 | A1* | 1/2019 | Suzuki | B62M 6/50 |
| 2019/0047647 | A1* | 2/2019 | Lee | B62H 5/20 |
| 2019/0202403 | A1* | 7/2019 | Taljaard | B60R 25/04 |
| 2020/0087951 | A1* | 3/2020 | Lee | E05B 43/005 |

FOREIGN PATENT DOCUMENTS

| | | |
|---|---|---|
| CN | 106530470 A | 3/2017 |
| CN | 106600782 A | 4/2017 |
| CN | 106875533 A | 6/2017 |
| CN | 107862860 A | 3/2018 |
| CN | 207318102 U | 5/2018 |
| CN | 108154587 A | 6/2018 |

OTHER PUBLICATIONS

International Search Report in PCT/CN2019/109071 dated Dec. 27, 2019, 5 pages.
Written Opinion in PCT/CN2019/109071 dated Dec. 27, 2019, 4 pages.

* cited by examiner

SYSTEMS AND METHODS FOR CONTROLLING A LOCK OF A VEHICLE

CROSS-REFERENCE TO RELATED APPLICATIONS

This application is a continuation of International Application No. PCT/CN2019/109071, filed on Sep. 29, 2019, which claims priority of Chinese Application No. 201811161064.4, filed on Sep. 30, 2018, the contents of which are incorporated herein in its entirety by reference.

TECHNICAL FIELD

The present disclosure generally relates to technical fields of locks, and more particularly, to systems and methods for controlling a lock of a vehicle.

BACKGROUND

With people's increasing awareness of environmental protection, low-carbon travel has become more and more popular. A large number of shared vehicles bring convenience to people. Locks are widely used to ensure the safety of the shared vehicles. Every time a user finishes using a shared vehicle, the lock of the shared vehicle is locked. However, frequently locking the locks results in great power consumption and reduced life of the locks. In addition, some existing locks are sometimes locked by mistake when the vehicles are being used by users. Thus, it is desirable to provide systems and methods for controlling the locks to save power consumption, extend the use-life of the locks, and avoid locking the locks by mistake.

SUMMARY

An aspect of the present disclosure introduces a system for controlling a lock of a vehicle. The system may include at least one storage medium including a set of instructions for controlling the lock of the vehicle, and at least one processor in communication with the storage medium. When executing the set of instructions, the at least one processor may perform the following operations. The at least one processor may determine if there is a valid unlocking instruction when the vehicle is in a valid-unlocked state; determine if the vehicle is moved; send a locking instruction to the lock upon the determination that: there is not a valid unlocking instruction, and the vehicle is moved; or keep the lock in the valid-unlocked state.

In some embodiments, to determine if there is a valid unlocking instruction, the at least one processor may determine whether the at least one processor receives the valid unlocking instruction from a user terminal of a user.

In some embodiments, the valid unlocking instruction may include valid authentication information of the user terminal and valid authentication information of the vehicle, wherein: the valid authentication information of the user terminal may include an identification of the user, and the valid authentication information of the vehicle may include an identification of the vehicle.

In some embodiments, to determine if there is a valid unlocking instruction, the at least one processor may determine whether the at least one processor receives the valid unlocking instruction from a server, wherein the valid unlocking instruction is generated by the server after receiving valid authentication information from a user terminal of a user.

In some embodiments, to determine whether the vehicle is moved, the at least one processor may obtain position signals from a position sensor mounted on the vehicle in real time; and determine whether the vehicle is stationary based on the position signals.

In some embodiments, to determine whether the vehicle is stationary, the at least one processor may determine whether the vehicle has been stopped for a time period threshold based on the position signals; and in response to a determination that the vehicle has been stopped for the time period threshold, determine that the vehicle is stationary.

In some embodiments, the at least one processor may further determine whether a movement speed of the vehicle is greater than a speed threshold based on the position signals; and in response to a determination that the movement speed is greater than the speed threshold, determine that the vehicle is moved.

In some embodiments, the position sensor may include at least one of a global positioning system (GPS), a displacement sensor, or a speed sensor.

In some embodiments, to determine whether the vehicle is moved, the at least one processor may obtain rotation signals from a rotation sensor mounted on a wheel of the vehicle in real time; and determine whether the vehicle is moved based on the rotation signals.

In some embodiments, to determine whether the vehicle is moved, the at least one processor may determine whether a rotation angle of the wheel is greater than an angle threshold based on the rotation signals; and in response to a determination that the rotation angle is greater than the angle threshold, determine that the vehicle is moved.

In some embodiments, the rotation sensor may include at least one of a gravity sensor, a gradienter, or a tachometer.

According to another aspect of the present disclosure, a method for controlling a lock of a vehicle is provided. The method may include determining if there is a valid unlocking instruction when the vehicle is in a valid-unlocked state; determining if the vehicle is moved; sending a locking instruction to the lock upon the determination that: there is not a valid unlocking instruction, and the vehicle is moved; or keeping the lock in the valid-unlocked state.

According to still another aspect of the present disclosure, a non-transitory computer-readable medium, comprising at least one set of instructions compatible for controlling a lock of a vehicle is provided. When executed by at least one processor of an electrical device, the at least one set of instructions may direct the at least one processor to perform the following operations. The at least one processor may determine if there is a valid unlocking instruction when the vehicle is in a valid-unlocked state; determine if the vehicle is moved; send a locking instruction to the lock upon the determination that: there is not a valid unlocking instruction, and the vehicle is moved; or keep the lock in the valid-unlocked state.

According to still another aspect of the present disclosure, a system for controlling a lock of a vehicle is provided. The system may include a monitoring module and a controlling module. The monitoring module may be configured to determine if there is a valid unlocking instruction when the vehicle is in a valid-unlocked state; and determine if the vehicle is moved. The controlling module may be configured to send a locking instruction to the lock upon the determination that: there is not a valid unlocking instruction, and the vehicle is moved; or keep the lock in the valid-unlocked state.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
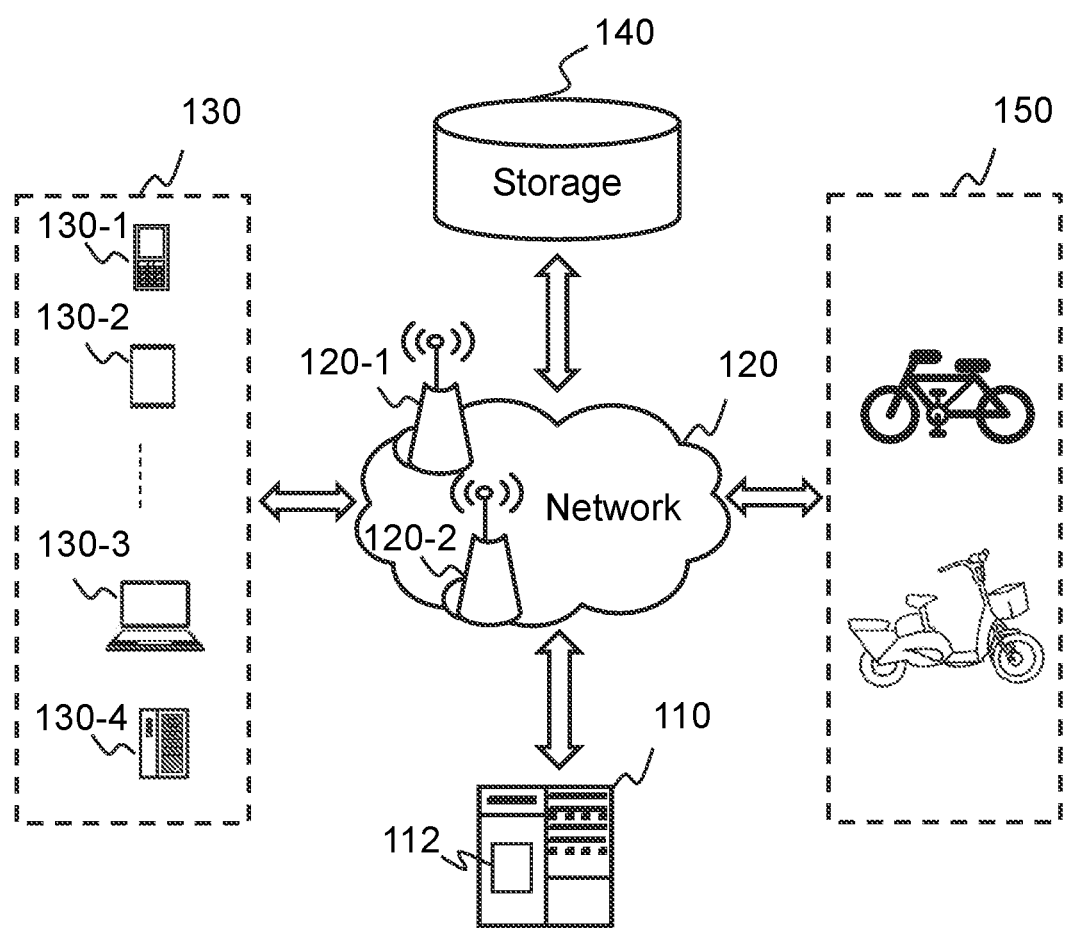
FIG. 1 is a schematic diagram illustrating an exemplary system for controlling a lock of a vehicle according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for controlling a lock of a vehicle. To this end, the systems and methods may always keep the lock in an unlocked state as normality. The lock may be locked only when the vehicle is abnormally moved. When there is not a valid unlocking instruction sent from a user terminal of a user or a server and the vehicle is moved at the same time, the systems and methods may determine that the vehicle is abnormally moved. In this way, the systems and methods of the present disclosure may avoid frequent unlocking or locking the lock to save power consumption and extend the use-life of the lock. In addition, the systems and methods may also avoid locking the lock by mistake, especially when the vehicle is moving.

FIG. 1 is a schematic diagram of an exemplary system 100 for controlling a lock of a vehicle according to some embodiments of the present disclosure. For example, the system 100 may be an online to offline service platform for providing services such as taxi hailing, chauffeur services, delivery vehicles, carpool, bus service, driver hiring, shuttle services, online navigation services, good delivery services, shared vehicle services, etc. The system 100 may include a server 110, a network 120, a user terminal 130, a storage 140, and a vehicle 150. The server 110 may include a processing engine 112.

The server 110 may be configured to process information and/or data relating to controlling the lock. For example, the server 110 may determine if there is a valid unlocking instruction when the vehicle is in a valid-unlocked state. As another example, the server 110 may determine if the vehicle is moved. As still another example, the server 110 may send locking instruction to the lock upon the determination that there is not a valid unlocking instruction, and the vehicle is moved. Otherwise, the server 110 may keep the lock in the valid-unlocked state. In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the user terminal 130, and/or the storage 140 via the network 120. As another example, the server 110 may connect the user terminal 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to relating to controlling the lock to perform one or more functions described in the present disclosure. For example, the processing engine 112 may determine if there is a valid unlocking instruction when the vehicle is in a valid-unlocked state. As another example, the processing engine 112 may determine if the vehicle is moved. As still another example, the processing engine 112 may send locking instruction to the lock upon the determination that there is not a valid unlocking instruction, and the vehicle is moved. Otherwise, the processing engine 112 may keep the lock in the valid-unlocked state. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components of the system 100 (e.g., the server 110, the user terminal 130, and the storage 140) may transmit information and/or data to other component(s) in the system 100 via the network 120. For example, the server 110 may send a locking instruction to the lock via the network 120. As another example, the server 110 may obtain position signals (or rotation signals) from a position sensor (or a rotation sensor) via the network 120. In some embodiments, the network 120 may be any type of wired or wireless network, or combination thereof. Merely by way of example, the network 120 may be a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them.

The user terminal 130 may be any electronic device used by a service requester of a shared vehicle service. In some embodiments, the user terminal 130 may be a mobile device 130-1, a tablet computer 130-2, a laptop computer 130-3, a desktop computer 130-4, or the like, or any combination thereof. In some embodiments, the mobile device 130-1 may be a wearable device, a smart mobile device, a virtual reality device, an augmented reality device, or the like, or any combination thereof. In some embodiments, the wearable device may be a smart bracelet, a smart footgear, a smart glass, a smart helmet, a smartwatch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™, a RiftCon™, a Fragments™, a Gear VR™, etc. In some embodiments, the desktop computer 130-4 may be an onboard computer, an onboard television, etc.

In some embodiments, the user terminal 130 may be a device with positioning technology for locating the position of the passenger and/or the user terminal 130. The positioning technology used in the present disclosure may be a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

In some embodiments, the user terminal 130 may further include at least one network port. The at least one network port may be configured to send information to and/or receive information from one or more components in the system 100 (e.g., the server 110, the storage 140) via the network 120. In some embodiments, the user terminal 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the user terminal 130 or the server 110 (e.g., a locking instruction). As another example, the storage 140 may store position signals from a position sensor mounted on the vehicle or rotation signals from a rotation sensor mounted on a wheel of the vehicle. As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the user terminal 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the user terminal 130). In some embodiments, the storage 140 may be part of the server 110.

The vehicle 150 may be any type of vehicles. For example, the vehicle 150 may include a shared bike, a shared electro bike, a shred car, a shared van, a shared scooter, a shared unmanned aerial vehicle, or the like, or any combination thereof. In some embodiments, the vehicle 150 may have equivalent structures that enable the vehicle 150 to move around or fly. For example, the vehicle 150 may include structures of a conventional vehicle, for example, a chassis, a suspension, a steering device (e.g., a steering wheel), a brake device (e.g., a brake pedal), an accelerator, etc. As another example, the vehicle 150 may have a body and at least one wheel. The body may be any body style, such as a sports vehicle, a coupe, a sedan, a pick-up truck, a station wagon, a sports utility vehicle (SUV), a minivan, or a conversion van. In some embodiments, it is contemplated that vehicle 150 may be an electric vehicle, a fuel cell vehicle, a hybrid vehicle, a conventional internal combustion engine vehicle, etc. In some embodiments, the vehicle 150 may include one or more sensors mounted on the vehicle 150. For example, the one or more sensors may include a global position system (GPS) module, a displacement sensor, a speed sensor, a radar (e.g., a light detection and ranging (LiDAR)), an inertial measurement unit (IMU), a camera, a gravity sensor, a gradienter, a tachometer, or the like, or any combination thereof. In some embodiments, the vehicle 150 may include one or more locks to fasten the vehicle. The lock communicated with the server 110 or may be controlled by a lock control device communicating with the server 110. In some embodiments, the lock may be directly controlled by the server 110 or may be controlled by the lock control device.

In some embodiments, one or more components of the system 100 (e.g., the server 110, the user terminal 130, the storage 140, and the vehicle 150) may communicate with each other in form of electronic and/or electromagnetic signals, through wired and/or wireless communication. In some embodiments, the system 100 may further include at least one data exchange port. The at least one exchange port may be configured to receive information and/or send information relating to controlling the lock (e.g., in form of electronic signals and/or electromagnetic signals) between any electronic devices in the system 100. In some embodiments, the at least one data exchange port may be one or more of an antenna, a network interface, a network port, or the like, or any combination thereof. For example, the at least one data exchange port may be a network port connected to the server 110 to send information thereto and/or receive information transmitted therefrom.

Figure 2:
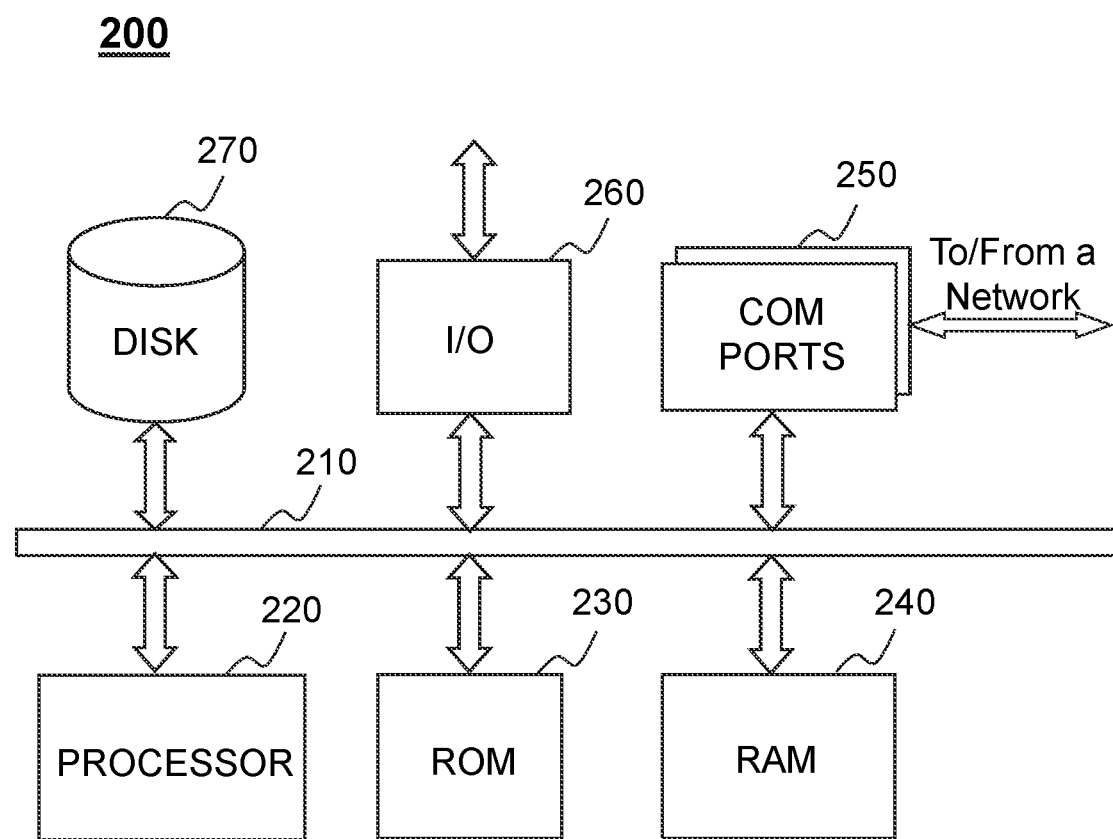
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the user terminal 130 may be implemented according to some embodiments of the present disclosure. For example, the processing engine 112 may be implemented on the computing device 200 and configured to perform functions of the processing engine 112 disclosed in this disclosure.

The computing device 200 may be used to implement a system 100 for the present disclosure. The computing device 200 may be used to implement any component of system 100 that performs one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the user terminal 130) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operating systems stored in the ROM 230, RAM 240, and/or other type of non-transitory storage medium to be executed by the processor 220. The program instructions may be compatible with the operating systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
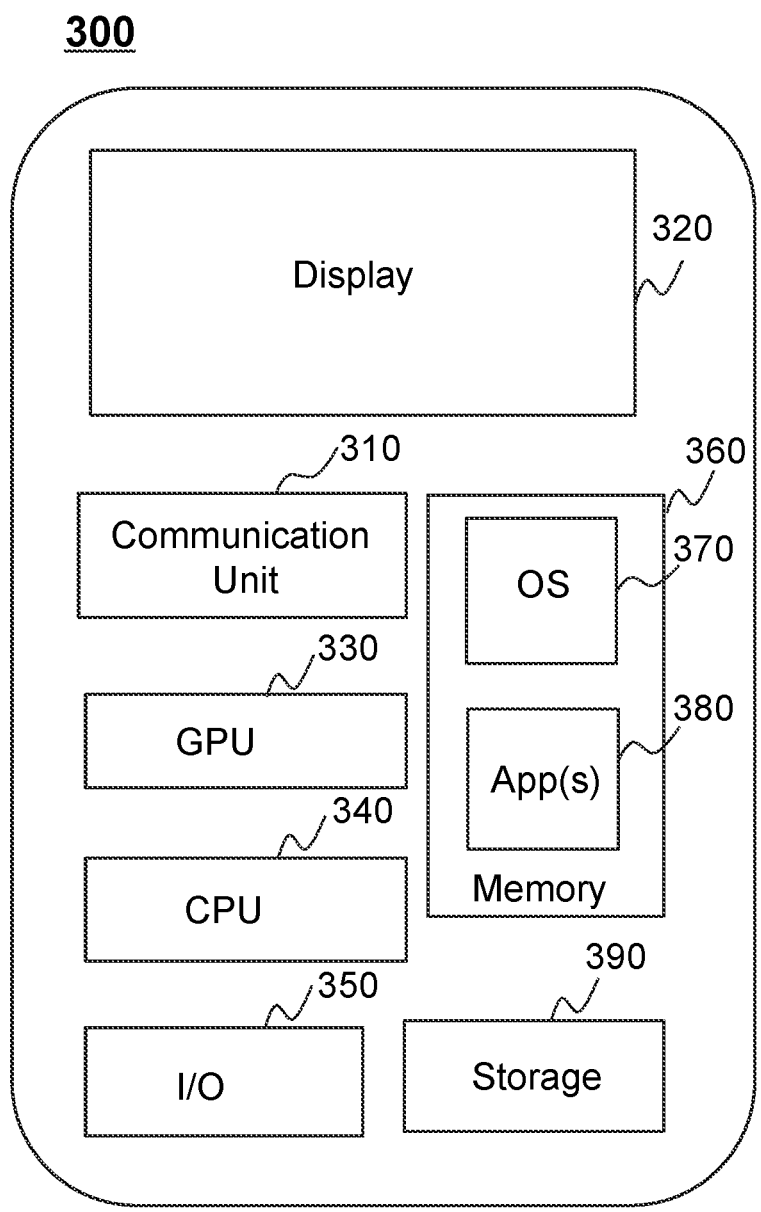
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the user terminal 130 may be implemented according to some embodiments of the present disclosure.

As illustrated in FIG. 3, the mobile device 300 may include a communication platform 310, a display 320, a graphics processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to controlling the lock of the vehicle. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-10). The hardware elements, operating systems and programming languages of such computers are conventional in nature, and it is presumed that those skilled in the art are adequately familiar therewith to adapt those technologies to control the lock of the vehicle as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the system 100 performs, the element may perform through electrical signals and/or electromagnetic signals. For example, when a server 110 processes a task, such as controlling the lock of the vehicle, the server 110 may operate logic circuits in its processor to process such task. When the server 110 completes determining that there is not a valid unlocking instruction and the vehicle is moved, the processor of the server 110 may generate electrical signals encoding a locking instruction and send the locking instruction to the lock. The processor of the server 110 may then send the electrical signals to at least one data exchange port of a target system associated with the server 110. The server 110 communicates with the target system via a wired network, the at least one data exchange port may be physically connected to a cable, which may further transmit the electrical signals to an input port (e.g., an information exchange port) of the user terminal 130. If the server 110 communicates with the target system via a wireless network, the at least one data exchange port of the target system may be one or more antennas, which may convert the electrical signals to electromagnetic signals. Within an electronic device, such as the user terminal 130, and/or the server 110, when a processor thereof processes an instruction, sends out an instruction, and/or performs an action, the instruction and/or action is conducted via electrical signals. For example, when the processor retrieves or saves data from a storage medium (e.g., the storage 140), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4:
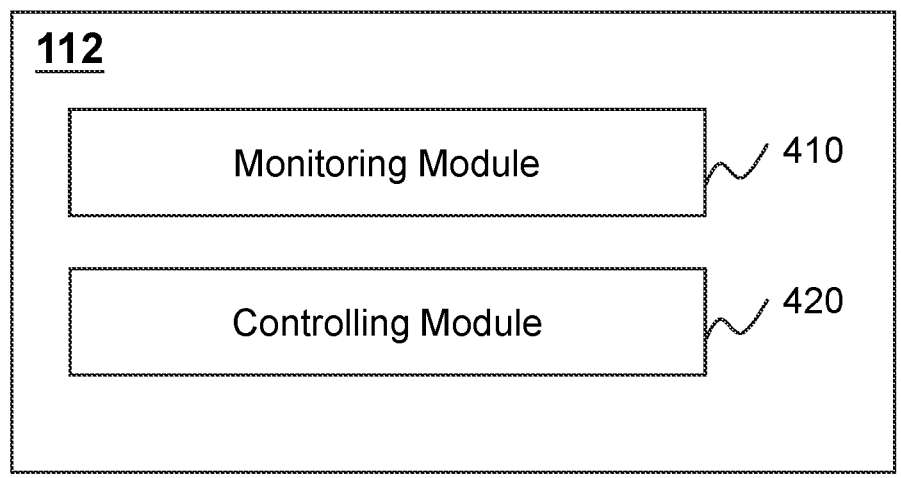
FIG. 4 is a block diagram illustrating an exemplary processing engine according to some embodiments of the present disclosure.

FIG. 4 is a block diagram illustrating an exemplary processing engine 112 according to some embodiments of the present disclosure. As illustrated in FIG. 4, the processing engine 112 may include a monitoring module 410 and a controlling module 420.

The monitoring module 410 may be configured to monitor situations associated with the vehicle. For example, the monitoring module 410 may determine if there is a valid unlocking instruction when the vehicle is in a valid-unlocked state. As another example, the monitoring module 410 may determine if the vehicle is moved.

The controlling module 420 may be configured to control the lock upon situations monitored by the monitoring module 410. For example, the controlling module 420 may send a locking instruction to the lock when there is not a valid unlocking instruction and the vehicle is moved. Otherwise, the controlling module 420 may control the lock to keep in the valid-unlocked state.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the monitoring module 410 may be divided into two or more units for if there is a valid unlocking instruction when the vehicle is in a valid-unlocked state, and determining if the vehicle is moved, respectively. As another example, the processing engine 112 may include a storage module (not shown) used to store data and/or information relating to controlling the lock.

Figure 5:
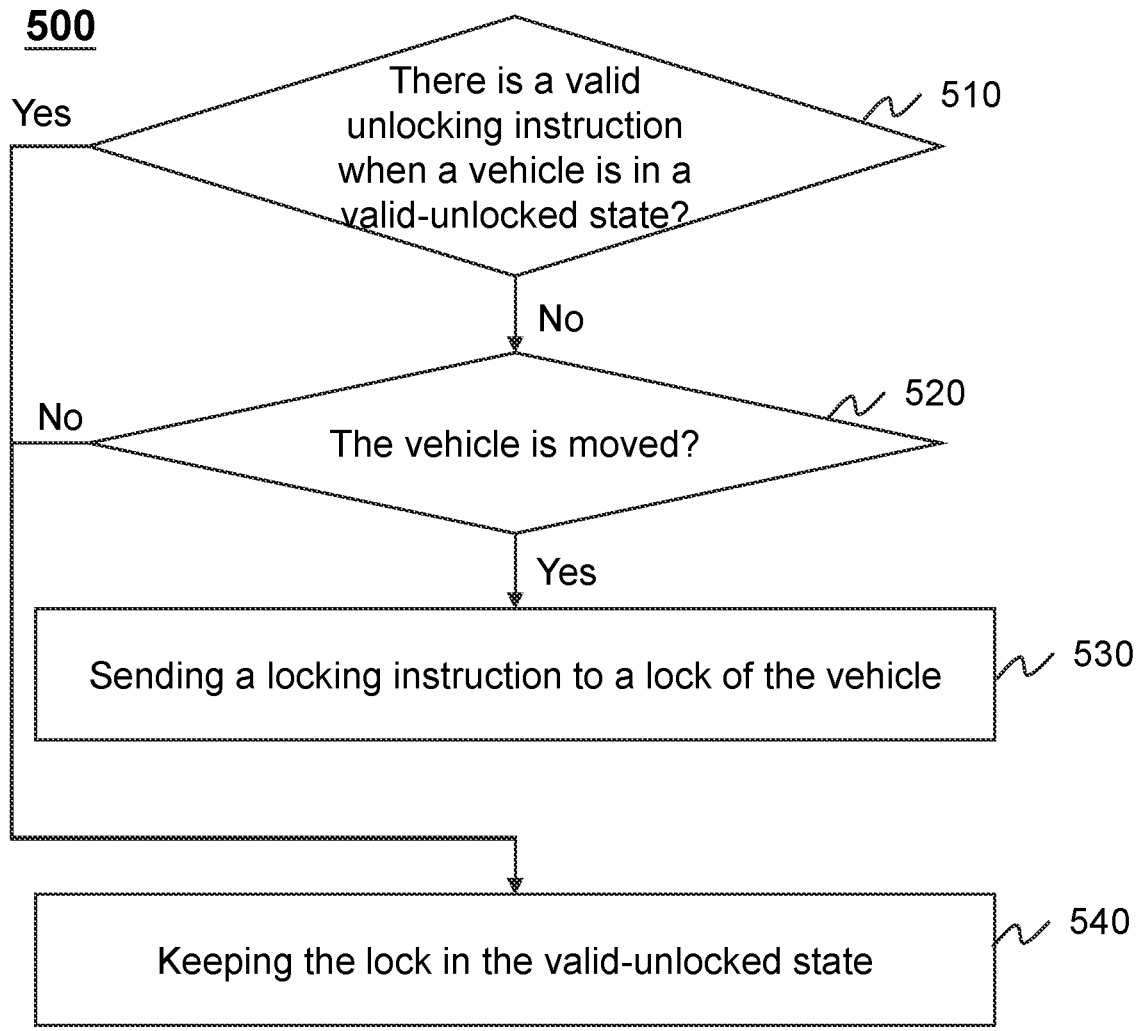
FIG. 5 is a flowchart illustrating an exemplary process for controlling a lock of a vehicle according to some embodiments of the present disclosure.

FIG. 5 is a flowchart illustrating an exemplary process 500 for controlling a lock of a vehicle according to some embodiments of the present disclosure. The process 500 may be executed by the system 100. For example, the process 500 may be implemented as a set of instructions (e.g., an application) stored in the storage ROM 230 or RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the monitoring module 410) may determine whether there is a valid unlocking instruction when the vehicle is in a valid-unlocked state.

In some embodiments, in the valid-unlocked state, the lock of the vehicle may be unlocked as normality. The vehicle in the valid-unlocked state may be stationary or dynamic. For example, when a user is using the vehicle during an order, the lock may be unlocked and the vehicle may be in the valid-unlocked state. As another example, when the vehicle is idle (the vehicle is not used by any user and vehicle is stationary), the lock may also be unlocked and the vehicle may be also in the valid-unlocked state. In some embodiments, the vehicle may be in a valid-locked state or an invalid-unlocked state. In the valid-locked state, the lock of the vehicle may be locked. The vehicle in the valid-locked state may be stationary. For example, upon determining that the vehicle is abnormally moved without a valid unlocking instruction, the processing engine 112 may lock the vehicle into the valid-locked state. In the invalid-unlocked state, the lock may be in an arming state and are ready to be locked. The invalid-unlocked state may be between the valid-unlocked state and the valid-locked state. In some cases, if used properly, the vehicle can be continuously in a valid unlocked state so that many pre-order, in-order, and after-order (also pre-order for next order) cycles can pass without the need to lock the vehicle.

In some embodiments, the valid unlocking instruction may be an instruction that instructs a lock control device or the server 110 to unlock the lock. In some embodiments, the valid unlocking instruction may be sent from a user terminal 130 of a user or the server 110. For example, the valid unlocking instruction may include valid authentication information of the user terminal 130 and valid authentication information of the vehicle sent from the user terminal 130. In some embodiments, the valid authentication information of the user terminal 130 may indicate that the user of the user terminal 130 is a valid registered user of the online to offline service platform. For example, the valid authentication information of the user terminal 130 may include an identification of the user (or the user terminal 130). In some embodiments, the identification of the user (or the user terminal 130) may include a registered user name, a registered telephone number of the user, a registered user account in a vehicle-sharing application, or the like, or any combination thereof. In some embodiments, the valid authentication information of the vehicle may indicate that the vehicle is a valid vehicle of the online to offline service platform. For example, the valid authentication information of the vehicle may include an identification of the vehicle. In some embodiments, the identification of the vehicle may include a vehicle identification number of the vehicle, a license plate number of the vehicle, a code of the vehicle (e.g., a QR code, a one-dimensional code, a bar code, etc.), or the like, or any combination thereof. In some embodiments, the user may use the user terminal 130 to log in the vehicle-sharing application and scan the code of the vehicle to send the valid authentication information of the user and the vehicle to the processing engine 112 via the network 120. In some embodiments, the valid unlocking instruction may be sent from the server 110. For example, the valid unlocking instruction may be generated by the server 110 after receiving the valid authentication information from the user terminal 130. The server 110 may send the valid unlocking instruction to the processing engine 112 (the lock control device) via the network 120.

In some embodiments, the valid unlocking instruction may be generated according to wireless communication between the user terminal 130 and the lock of the vehicle. For example, the user terminal 130 (or a wireless communication unit of the user terminal 130) may communicate with the lock (or the vehicle or a wireless communication unit of the lock) to read the valid authentication information of the vehicle, and send the valid authentication information of the user terminal 130 and the valid authentication information of the vehicle to the server 110. In some embodiments, the means of communication between the user terminal 130 and the lock may include Bluetooth, Laura communication, narrow Band Internet of Things (NB-IoT), or the like, or any combination thereof. For example, the user of the user terminal 130 may log in to the vehicle-sharing application and communicate with the lock of the vehicle according to Bluetooth. The server 110 may generate the valid unlocking instruction after receiving the valid authentication information of the vehicle.

Figure 6:
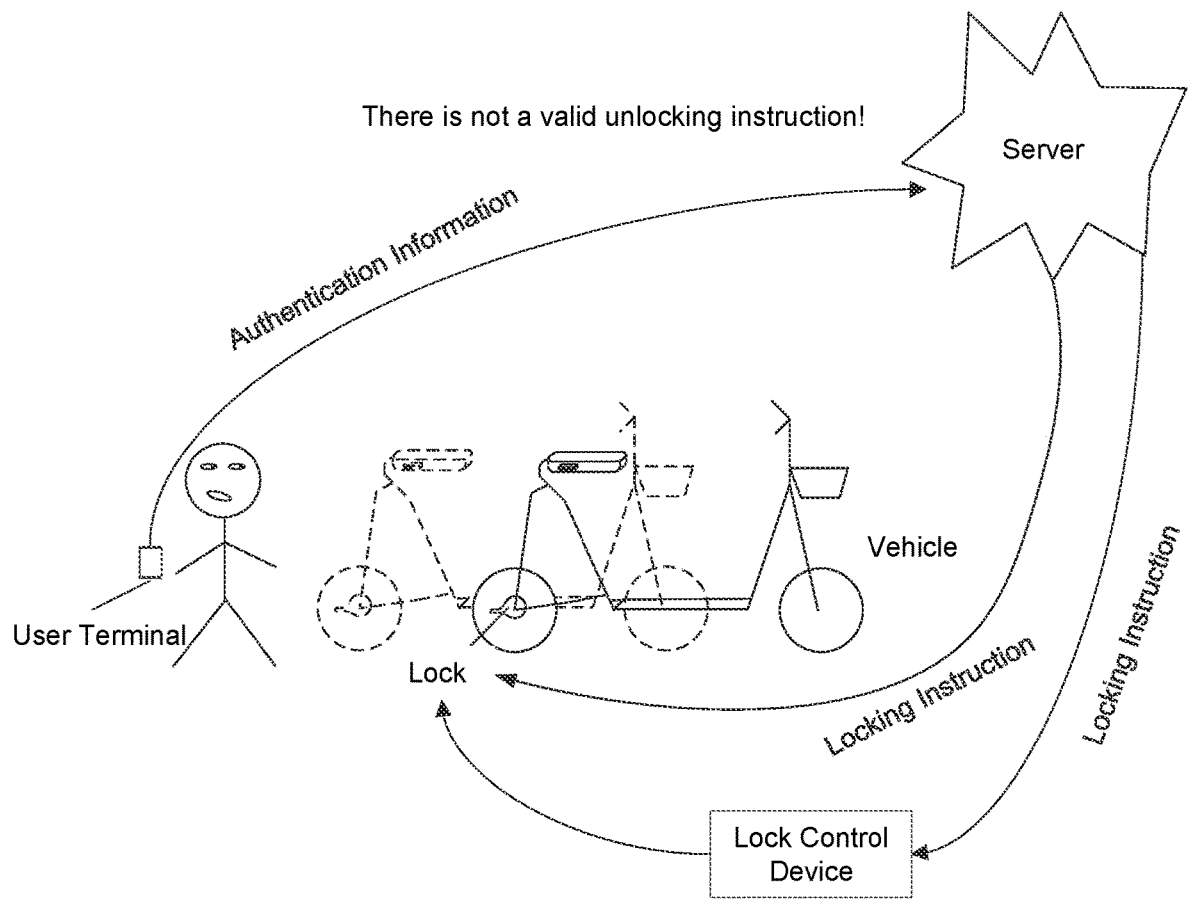
FIG. 6 is a schematic diagram illustrating an exemplary application scenario according to some embodiments of the present disclosure.

In some embodiments, the processing engine 112 may determine whether there is a valid unlocking instruction by determining whether receiving a valid unlocking instruction from the user terminal 130 of the user or the server 110. FIG. 6 is a schematic diagram illustrating an exemplary application scenario according to some embodiments of the present disclosure. In some embodiments, the processing engine 112 may be the server 110. As shown in FIG. 6, if the user terminal 130 sends a valid unlocking instruction to the server 110, the processing engine 112 may determine that there is a valid unlocking instruction. If the user terminal 130 sends an instruction without the valid authentication information of the user terminal and/or the valid authentication information of the vehicle, the processing engine 112 may determine that there is not a valid unlocking instruction. As still another example, if the server 110 does not receive any instruction from the user terminal 130, the processing engine 112 may determine that is not a valid unlocking instruction. In some embodiments, the processing engine 112 may be the lock control device. As shown in FIG. 6, if the server 110 generates a valid unlocking instruction after receiving valid authentication information from the user terminal 130 and sends the valid unlocking instruction to the lock control device, the processing engine 112 may determine that there is a valid unlocking instruction. If the server 110 sends an instruction without the valid authentication information of the user terminal and/or the valid authentication information of the vehicle to the lock control device, the processing engine 112 may determine that there is not a valid unlocking instruction. As still another example, if the server 110 does not send any instruction to the lock control device, the processing engine 112 may determine that is not a valid unlocking instruction.

In 520, in response to a determination that there is no valid unlocking instruction, the processing engine 112 (e.g., the processor 220, the monitoring module 410) may determine whether the vehicle is moved.

In some embodiments, the processing engine 112 may determine whether the vehicle is moved by determining whether the vehicle is moved from the valid-unlocked state (a stationary state). In some embodiments, the processing engine 112 may first determine whether the vehicle is stationary, and then determine whether the vehicle is moved. For example, the processing engine 112 may determine whether the vehicle is stationary and/or moved by analyzing data obtained from one or more sensors mounted on the vehicle. In some embodiments, the one or more sensors may send the data to the processing engine 112 in real time. In some embodiments, the one or more sensors may send the data to the processing engine 112 every predetermined interval. For example, a position sensor (e.g., a global positioning system (GPS), a displacement sensor, or a speed sensor) may send position signals to the processing engine 112 every predetermined interval. As another example, a rotation sensor (e.g., a gravity sensor, a gradienter, or a tachometer) may send rotation signals to the processing engine 112 every predetermined interval. In some embodiments, the predetermined interval may be a default value stored in a storage (e.g., the storage 140) of the system 100, or be dynamically determined according to different situations. Exemplary methods for determining whether the vehicle is stationary may be found elsewhere (e.g., FIGS. 7-10 and the descriptions thereof) in the present disclosure.

In 530, in response to a determination that the vehicle is moved, the processing engine 112 (e.g., the processor 220, the controlling module 420) may send a locking instruction to the lock of the vehicle.

In some embodiments, the locking instruction may be an instruction that instructs the lock control device or the server 110 to lock the lock. In some embodiments, upon the determinations that there is no valid unlocking instruction and that the vehicle is moved at the same time, the processing engine 112 may determine that the vehicle is abnormally moved. Keeping the lock in the valid-unlocked state may leave the vehicle unsafe or may lead to the vehicle being stolen or misused. In some embodiments, the processing engine 112 may automatically send the locking instruction to the lock directly. The lock may be locked immediately upon the locking instruction. In some embodiments, the processing engine 112 may automatically send the locking instruction to the lock control device, and the lock control device may send the locking instruction to the lock. The lock may be locked immediately upon the locking instruction. In some embodiments, the time that the server 110 or the lock control device uses to lock the lock may be very short. Once the processing engine 112 monitors that there is not a valid unlocking instruction and that the vehicle is moved, the server 110 or the lock control device may immediately send the locking instruction to the lock, and the lock may be immediately locked.

In 540, in response to a determination that there is a valid unlocking instruction or that the vehicle is not moved, the processing engine 112 (e.g., the processor 220, the controlling module 420) may keep the lock in the valid-unlocked state.

In some embodiments, upon the determination that there is a valid unlocking instruction, the processing engine 112 may determine that the vehicle is normally used by the user terminal 130. The processing engine 112 may not send any instruction to the lock and keep the lock in the valid-unlocked state. In some embodiments, upon the determination that the vehicle is not moved, the processing engine 112 may determine that the vehicle is idle. The processing engine 112 may not send any instruction to the lock and keep the lock in the valid-unlocked state. In some embodiments, if there is a valid unlocking instruction and the vehicle is moved, the processing engine 112 may determine that the user of the user terminal 130 may be using the vehicle during an order, the processing engine 112 may not send any instruction to the lock and keep the lock in the valid-unlocked state. In some embodiments, if the vehicle is not moved and there is not a valid unlocking instruction, the lock of the vehicle may be in the arming state, and the processing engine 112 may not send any instruction to the lock and keep the lock in the valid-unlocked state. Only when the vehicle is moved, the processing engine 112 may send the locking instruction to the lock of the vehicle.

In some embodiments, in some cases, the processing engine 112 may not lock the lock immediately. For example, when the vehicle is moving very fast, the processing engine 112 may first slow down the vehicle. Only when a speed of the vehicle is less than a speed threshold, the processing engine 112 may send the locking instruction to the lock of the vehicle. The speed threshold may protect a person who is using the vehicle from injury. In some embodiments, the speed threshold may be a default value stored in a storage (e.g., the storage 140) of the system 100, or be dynamically determined according to different situations. For example, the speed threshold may 1 km/h, 2 km/h, 3 km/h, etc. In some embodiments, the processing engine 112 may first send warning information before locking the lock. The warning information may inform a user of the vehicle that the vehicle is now abnormally used, and the vehicle may be locked immediately if the vehicle is continued to be abnormally used. For example, the processing engine 112 may send a piece of warning voice to alert the user via a speaker on the vehicle. As another example, the processing engine 112 may send a warning sign to alert the user via a screen on the vehicle. As still another example, the processing engine 112 may first find a telephone number (or an account of the application) of the user, and then send a warning message to the telephone number (or the account of the application) of the user.

In some embodiments, the lock of the vehicle may remain the valid-unlocked state as normality. Only when the vehicle is abnormally moved, the lock may be locked. The method for controlling the lock of the vehicle according to the present disclosure may avoid frequent locking and unlocking of the lock to reduce power consumption and extend the use-life of the lock. In addition, the method for controlling the lock of the vehicle according to the present disclosure may also avoid locking the lock by mistake, especially when the vehicle is moving. The vehicle may be locked immediately once the processing engine 112 monitors an abnormal movement of the vehicle. The method according to the present disclosure may ensure both driving safety and vehicle safety.

It should be noted that the above description is merely provided for the purposes of illustration, and not intended to limit the scope of the present disclosure. For persons having ordinary skills in the art, multiple variations and modifications may be made under the teachings of the present disclosure. For example, the process 500 may further include one or more other conditions to determine whether to send the locking instruction to the lock. For example, the processing engine 112 may send the locking instruction to the lock if determining that the vehicle is out of a predetermined area. However, those variations and modifications do not depart from the scope of the present disclosure.

Figure 7:
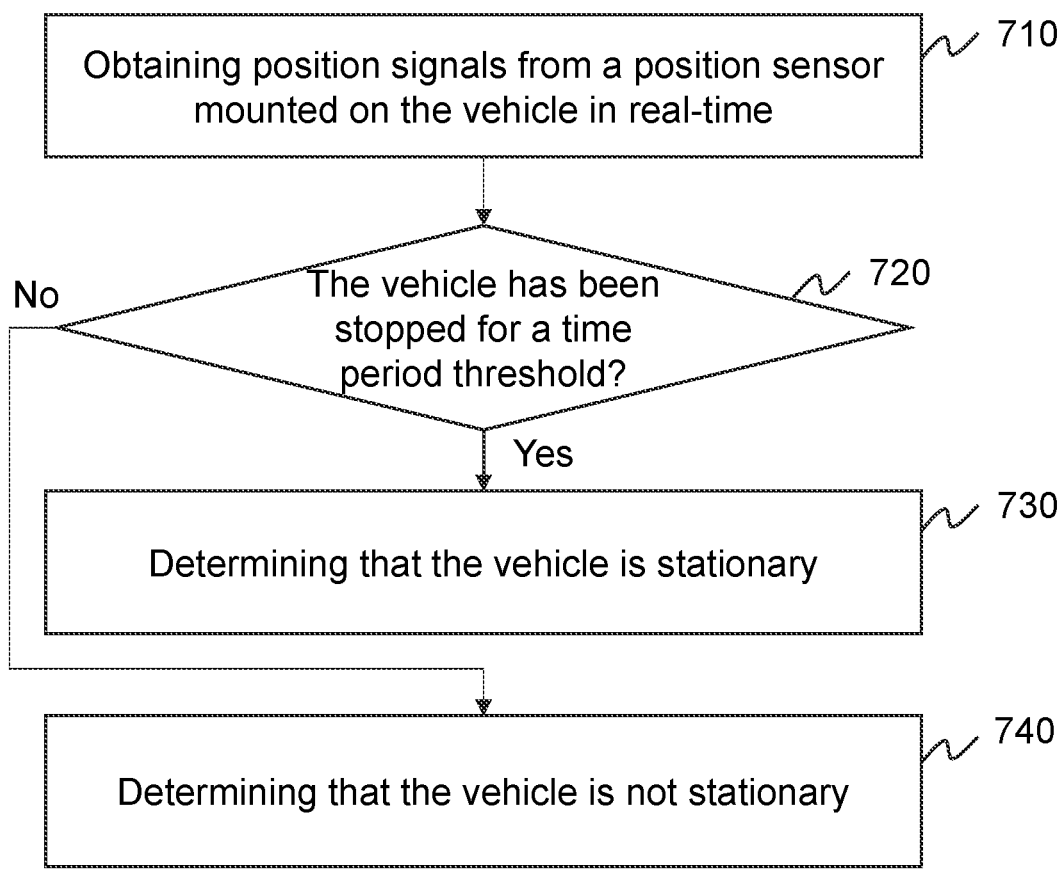
FIG. 7 is a flowchart illustrating an exemplary process for determining whether a vehicle is stationary according to some embodiments of the present disclosure.

FIG. 7 is a flowchart illustrating an exemplary process 700 for determining whether a vehicle is stationary according to some embodiments of the present disclosure. The process 700 may be executed by the system 100. For example, the process 700 may be implemented as a set of instructions (e.g., an application) stored in the storage ROM 230 or RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the monitoring module 410) may obtain position signals from a position sensor mounted on the vehicle in real time.

In some embodiments, the position sensor may be a device for sensing positions of the vehicle. For example, the position sensor may include a global positioning system (GPS), a displacement sensor, a speed sensor, or the like, or any combination thereof. In some embodiments, the position signals may include real time coordinates of the vehicle, real time speeds of the vehicle, or the like, or any combination thereof. In some embodiments, the position sensor may be mounted on any positions of the vehicle. For example, the position sensor may be mounted on a wheel of the vehicle, a handlebar of the vehicle, the body of the vehicle, or the like, or any combination thereof. In some embodiments, the position sensor may send the position signals to the processing engine 112 in real time via the network 120. In some embodiments, the position sensor may send the position signals to the processing engine 112 every predetermined time interval via the network 120. In some embodiments, the predetermined time interval may be a default value stored in a storage (e.g., the storage 140) of the system 100, or be dynamically determined according to different situations. For example, the predetermined time interval may be 0.1 s, 0.5 s, 1 s, 3 s, 5 s, 10 s, etc.

In some embodiments, the processing engine 112 may determine whether the vehicle is stationary based on the position signals. In some embodiments, the stationary may describe a state of the vehicle relative to moving the vehicle. In some embodiments, the processing engine 112 may determine whether the vehicle is stationary or moved based on the position signals obtained from the position sensor for a period of time. The processing engine 112 may compare the position signals obtained at different moments to determine whether the vehicle is stationary or moved. In some embodiments, in order to avoid randomly moving of the vehicle, the processing engine 112 may set a time period threshold. If the position signals indicate that the vehicle is stopped somewhere for greater than the time period threshold, the processing engine 112 may determine that the vehicle is stationary.

In 720, the processing engine 112 (e.g., the processor 220, the monitoring module 410) may determine whether the vehicle has been stopped for a time period threshold.

In some embodiments, the processing engine 112 may compare the position signals obtained from the position sensor. For example, if the position signals indicate that the position of the vehicle is not changed for greater than the time period threshold, the processing engine 112 may determine that the vehicle has been stopped for the time period threshold. In some embodiments, the time period threshold may be used to avoid the vehicle being randomly moved. In some embodiments, the time period threshold may be a default value stored in a storage (e.g., the storage 140) of the system 100, or be dynamically determined according to different situations. For example, the time period threshold may be 3 s, 5 s, 8 s, etc.

In 730, in response to a determination that the vehicle has been stopped for the time period threshold, the processing engine 112 (e.g., the processor 220, the monitoring module 410) may determine that the vehicle is stationary. If the vehicle has not been stopped for the time period threshold, in 740, the processing engine 112 (e.g., the processor 220, the monitoring module 410) may determine that the vehicle is not stationary. For example, the processing engine 112 may determine that the vehicle is randomly moved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700. In some embodiments, the position sensor may have a processing function to determine whether the vehicle is stationary or moved based on the position signals.

Figure 8:
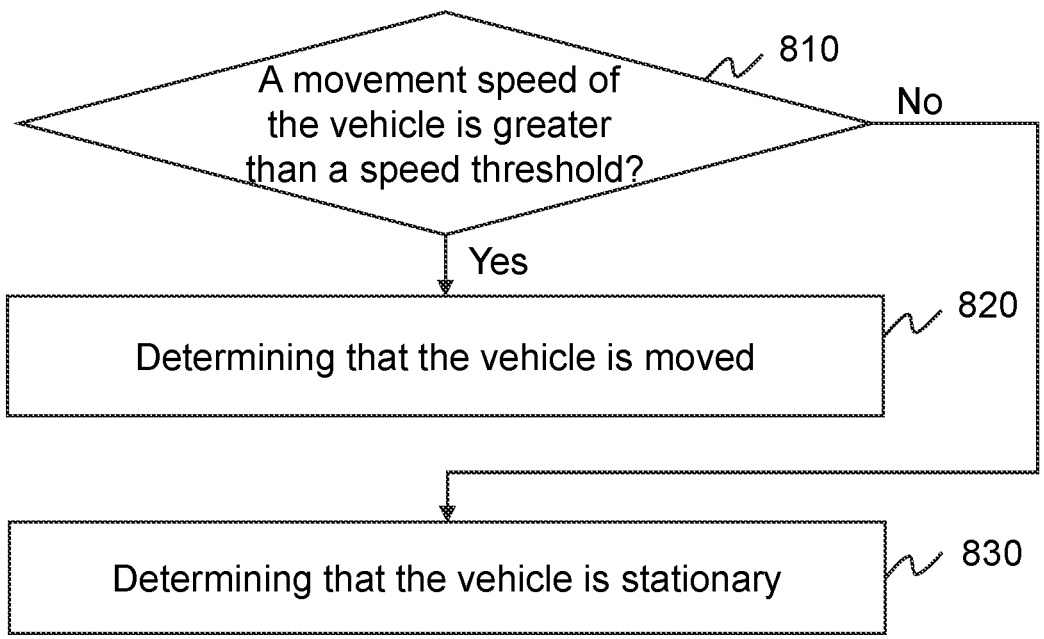
FIG. 8 is a flowchart illustrating an exemplary process for determining whether a vehicle is moved according to some embodiments of the present disclosure.

FIG. 8 is a flowchart illustrating an exemplary process 800 for determining whether a vehicle is moved according to some embodiments of the present disclosure. The process 800 may be executed by the system 100. For example, the process 800 may be implemented as a set of instructions (e.g., an application) stored in the storage ROM 230 or RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing engine 112 (e.g., the processor 220, the monitoring module 410) may determine whether a movement speed of the vehicle is greater than a speed threshold.

In some embodiments, the processing engine 112 may determine the movement speed of the vehicle based on the position signals obtained from the position sensor. For example, the processing engine 112 may determine a distance that the vehicle has moved by comparing real time positions at two moments. The processing engine 112 may determine the movement speed by dividing the distance by a time interval between the two moments. In some embodiments, the speed threshold may be used to ensure driving safety. In some embodiments, the speed threshold may be a default value stored in a storage (e.g., the storage 140) of the system 100, or be dynamically determined according to different situations. For example, the speed threshold may be 3 km/h, 5 km/h, 7 km/h, etc.

In 820, in response to a determination that the movement speed is greater than the speed threshold, the processing engine 112 (e.g., the processor 220, the monitoring module 410) may determine that the vehicle is moved.

In some embodiments, if the movement speed of the vehicle is greater than the speed threshold, the processing engine 112 may determine that the vehicle is moved. For example, the speed threshold may be 5 km/h. The processing engine 112 may determine that the vehicle is moved if the movement speed is greater than 5 km/h. The processing engine 112 may send the locking instruction to the lock upon the determinations that there is not a valid unlocking instruction and that the vehicle is moved. The vehicle may be locked immediately when the movement speed is 5 km/h. The locking of the lock may not bring potential risk if the vehicle is stolen or misused and the vehicle is being driven.

In 830, in response to a determination that the movement speed of the vehicle is not greater than the speed threshold, the processing engine 112 (e.g., the processor 220, the monitoring module 410) may determine that the vehicle is stationary. In some embodiments, the process 800 may proceed after the process 700. For example, the processing engine 112 may first determine whether the vehicle is stationary, and then determine whether the vehicle is moved from the stationary state.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 800. As another example, the processing engine 112 may determine whether the vehicle is moved based on position signals obtained from more than one position sensors to improve the accuracy of the determination.

Figure 9:
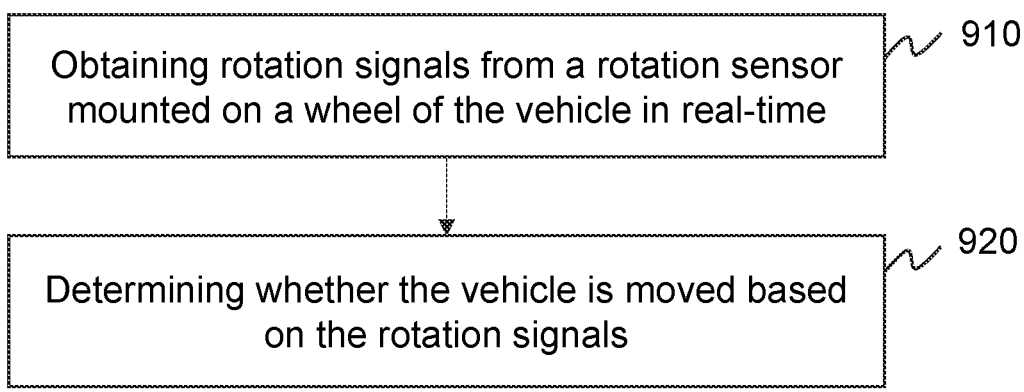
FIG. 9 is a flowchart illustrating an exemplary process for determining whether a vehicle is moved according to some embodiments of the present disclosure.

FIG. 9 is a flowchart illustrating an exemplary process 900 for determining whether a vehicle is moved according to some embodiments of the present disclosure. The process 900 may be executed by the system 100. For example, the process 900 may be implemented as a set of instructions (e.g., an application) stored in the storage ROM 230 or RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing engine 112 (e.g., the processor 220, the monitoring module 410) may obtain rotation signals from a rotation sensor mounted on a wheel of the vehicle in real time.

In some embodiments, the rotation sensor may be a device for sensing rotations of the wheel of the vehicle. For example, the rotation sensor may include a gravity sensor, a gradienter, a tachometer, an angle sensor, a position switch, or the like, or any combination thereof. For example, the rotation sensor may be the gravity sensor to determine a rotation angle at any point of the wheel based on accelerated speeds of multiaxis of the wheel. As another example, the rotation sensor may be the gradienter to measure a rotation angle at any point of the wheel relative to a horizontal plane (or the ground) directly. As still another example, the rotation sensor may be the tachometer to measure a rotation speed of the wheel. As still another example, the rotation sensor may be a speed sensor to convert the speed of the vehicle into the rotation signals. In some embodiments, the rotation signals may include a rotation angle of the wheel, a rotation speed of the wheel, or the like, or any combination thereof.

In some embodiments, the rotation sensor may be mounted on the wheel of the vehicle. In some embodiments, the rotation sensor may be mounted on any other positions of the vehicle. For example, the speed sensor may be the rotation sensor and be mounted on any position of the vehicle. In some embodiments, the rotation sensor may send the rotation signals to the processing engine 112 in real time via the network 120. In some embodiments, the rotation sensor may send the rotation signals to the processing engine 112 every predetermined time interval via the network 120. In some embodiments, the predetermined time interval may be a default value stored in a storage (e.g., the storage 140) of the system 100, or be dynamically determined according to different situations. For example, the predetermined time interval may be 0.1 s, 0.5 s, 1 s, 3 s, 5 s, 10 s, etc.

In 920, the processing engine 112 (e.g., the processor 220, the monitoring module 410) may determine whether the vehicle is moved based on the rotation signals.

In some embodiments, the processing engine 112 may determine whether the vehicle is moved based on the rotation signals obtained from the rotation sensor for a period of time. The processing engine 112 may compare the rotation signals obtained at different moments to determine whether the vehicle is moved. Exemplary methods for determining whether the vehicle is moved based on rotation signals may be found elsewhere (e.g., FIG. 10 and the descriptions thereof) in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 900. As another example, the rotation sensor may have a processing function to determine whether the vehicle is moved based on the rotation signals.

Figure 10:
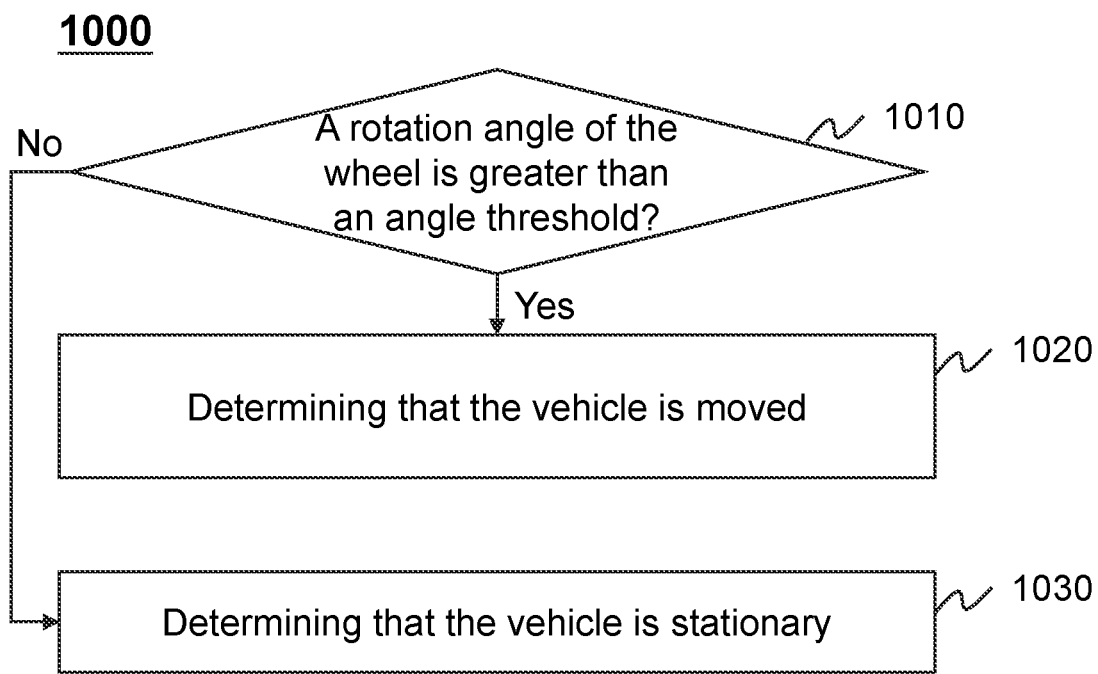
FIG. 10 is a flowchart illustrating an exemplary process for determining whether a vehicle is moved according to some embodiments of the present disclosure.

FIG. 10 is a flowchart illustrating an exemplary process 1000 for determining whether a vehicle is moved according to some embodiments of the present disclosure. The process 1000 may be executed by the system 100. For example, the process 1000 may be implemented as a set of instructions (e.g., an application) stored in the storage ROM 230 or RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220, the monitoring module 410) may determine whether a rotation angle of the wheel is greater than an angle threshold.

In some embodiments, the processing engine 112 may determine the rotation angle based on the rotation signals obtained from the rotation sensor. For example, the processing engine 112 may obtain the rotation angle relative to the horizontal plane (or the ground) from the gradienter directly. As another example, the processing engine 112 may obtain the rotation speed of the wheel from the tachometer and determine the rotation angle by multiplying the rotation speed to a rotation time period. In some embodiments, the angle threshold may be a default value stored in a storage (e.g., the storage 140) of the system 100, or be dynamically determined according to different situations. For example, the angle threshold may be 100°, 120°, 150°, etc.

In 1020, in response to a determination that the rotation angle of the wheel is greater than the angle threshold, the processing engine 112 (e.g., the processor 220, the monitoring module 410) may determine that the vehicle is moved.

In some embodiments, if the rotation angle is greater than the angle threshold, the processing engine 112 may determine that the vehicle is moved. For example, the angle threshold may be 120°. The processing engine 112 may determine that the vehicle is moved if the rotation angle is greater than 120°. The processing engine 112 may send the locking instruction to the lock upon the determinations that there is not a valid unlocking instruction and that the vehicle is moved. The vehicle may be locked immediately when the rotation angle is 120°. The locking of the lock may not bring potential risk if the vehicle is stolen or misused and the vehicle is being driven.

In 1030, in response to a determination that the rotation angle of the wheel is not greater than the angle threshold, the processing engine 112 (e.g., the processor 220, the monitoring module 410) may determine that the vehicle is stationary. In some embodiments, the process 1000 may proceed after the process 700. For example, the processing engine 112 may first determine whether the vehicle is stationary, and then determine whether the vehicle is moved from the stationary state.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1000. In some embodiments, the processing engine 112 may determine whether the vehicle is moved based on rotation signals obtained from more than one rotation sensors to improve the accuracy of the determination. In some embodiments, the processing engine 112 may determine whether the vehicle is moved based on both position signals and rotation signals to improve the accuracy of the determination.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A system for controlling a lock of a vehicle, comprising:
   at least one storage medium including a set of instructions for controlling the lock of the vehicle; and
   one processor in communication with the storage medium wherein when executing the set of instructions, the at least one processor is directed to:
     determine if there is a valid unlocking instruction when the vehicle is in a valid-unlocked state;
     determine if the vehicle is moved;
     upon the determination that:
       there is not a valid unlocking instruction, and
       the vehicle is moved,
     send a locking instruction to the lock of the vehicle; and
     upon the determination that:
       there is a valid unlocking instruction, or
       the vehicle is not moved,
     keep the lock in the valid-unlocked state.

2. The system of claim 1, wherein to determine if there is a valid unlocking instruction, the at least one processor is directed to:
   determine whether the at least one processor receives the valid unlocking instruction from a user terminal of a user.

3. The system of claim 2, wherein the valid unlocking instruction includes valid authentication information of the user terminal and valid authentication information of the vehicle, wherein:
   the valid authentication information of the user terminal includes an identification of the user, and
   the valid authentication information of the vehicle includes an identification of the vehicle.

4. The system of claim 1, wherein to determine if there is a valid unlocking instruction, the at least one processor is directed to:
   determine whether the at least one processor receives the valid unlocking instruction from a server, wherein the valid unlocking instruction is generated by the server after receiving valid authentication information from a user terminal of a user.

5. The system of claim 1, wherein to determine whether the vehicle is moved, the at least one processor is directed to:
   obtain position signals from a position sensor mounted on the vehicle in real time; and
   determine whether the vehicle is stationary based on the position signals.

6. The system of claim 5, wherein to determine whether the vehicle is stationary, the at least one processor is directed to:
   determine whether the vehicle has been stopped for a time period threshold based on the position signals; and
   in response to a determination that the vehicle has been stopped for the time period threshold, determine that the vehicle is stationary.

7. The system of claim 6, wherein the at least one processor is further directed to:
   determine whether a movement speed of the vehicle is greater than a speed threshold based on the position signals; and
   in response to a determination that the movement speed is greater than the speed threshold, determine that the vehicle is moved.

8. The system of claim 5, wherein the position sensor includes at least one of a global positioning system (GPS), a displacement sensor, or a speed sensor.

9. The system of claim 1, wherein to determine whether the vehicle is moved, the at least one processor is directed to:
   obtain rotation signals from a rotation sensor mounted on a wheel of the vehicle in real time; and determine whether the vehicle is moved based on the rotation signals.

10. The system of claim 9, wherein to determine whether the vehicle is moved, the at least one processor is directed to:
determine whether a rotation angle of the wheel is greater than an angle threshold based on the rotation signals; and
in response to a determination that the rotation angle is greater than the angle threshold, determine that the vehicle is moved.

11. The system of claim 9, wherein the rotation sensor includes at least one of a gravity sensor, a gradienter, or a tachometer.

12. A method for controlling a lock of a vehicle, comprising:
determining if there is a valid unlocking instruction when the vehicle is in a valid-unlocked state;
determining if the vehicle is moved;
upon the determination that:
there is not a valid unlocking instruction, and
the vehicle is moved,
sending a locking instruction to the lock of the vehicle; and
upon the determination that:
there is a valid unlocking instruction, or
the vehicle is not moved,
keeping the lock in the valid-unlocked state.

13. The method of claim 12, wherein the determining if there is a valid unlocking instruction includes:
determining whether the valid unlocking instruction is received from a user terminal of a user.

14. The method of claim 13, wherein the valid unlocking instruction includes valid authentication information of the user terminal and valid authentication information of the vehicle, wherein:
the valid authentication information of the user terminal includes an identification of the user, and
the valid authentication information of the vehicle includes an identification of the vehicle.

15. The method of claim 12, wherein the determining if there is a valid unlocking instruction includes:
determining whether the valid unlocking instruction is received from a server, wherein the valid unlocking instruction is generated by the server after receiving valid authentication information from a user terminal of a user.

16. The method of claim 12, wherein the determining whether the vehicle is moved includes:
obtaining position signals from a position sensor mounted on the vehicle in. real time; and
determining whether the vehicle is stationary based on the position signals.

17. The method of claim 16, wherein the determining whether the vehicle is stationary includes:
determining whether the vehicle has been stopped for a time period threshold based on the position signals; and
in response to a determination that the vehicle has been stopped for the time period threshold, determining that the vehicle is stationary.

18. The method of claim 17, further comprising:
determining whether a movement speed of the vehicle is greater than a speed threshold based on the position signals; and
in response to a determination that the movement speed is greater than the speed threshold, determining that the vehicle is moved.

19. The method of claim 12, wherein the determining whether the vehicle is moved includes:
obtaining rotation signals from a rotation sensor mounted on a wheel of the vehicle in real time; and
determining whether the vehicle is moved based on the rotation signals.

20. A non-transitory computer readable medium, comprising at least one set of instructions for controlling a lock of a vehicle, wherein when executed by at least one processor of an electrical device, the at least one set of instructions directs the at least one processor to perform a method, the method comprising:
determining if there is a valid unlocking instruction when the vehicle is in a valid-unlocked state;
determining if the vehicle is moved;
upon the determination that:
there is not a valid unlocking instruction, and
the vehicle is moved,
sending a locking instruction to the lock of the vehicle; and
upon the determination that:
there is a valid unlocking instruction, or
the vehicle is not moved,
keeping the lock in the valid-unlocked state.

* * * * *